United States Patent
Li et al.

(10) Patent No.: US 12,249,715 B2
(45) Date of Patent: Mar. 11, 2025

(54) COMPOSITE ARTIFICIAL GRAPHITE AND PREPARATION METHOD THEREOF, AND SECONDARY BATTERY AND POWER CONSUMING DEVICE COMPRISING THE COMPOSITE ARTIFICIAL GRAPHITE

(71) Applicant: CONTEMPORARY AMPEREX TECHNOLOGY (HONG KONG) LIMITED, Hong Kong (CN)

(72) Inventors: Yuanyuan Li, Ningde (CN); Rui Shen, Ningde (CN); Libing He, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 254 days.

(21) Appl. No.: 18/051,008

(22) Filed: Oct. 30, 2022

(65) Prior Publication Data
US 2023/0087876 A1    Mar. 23, 2023

Related U.S. Application Data

(63) Continuation of application No. PCT/CN2021/119709, filed on Sep. 22, 2021.

(51) Int. Cl.
*H01M 4/583* (2010.01)
*H01M 4/04* (2006.01)
*H01M 10/0525* (2010.01)
*H01M 4/02* (2006.01)

(52) U.S. Cl.
CPC ......... *H01M 4/583* (2013.01); *H01M 4/0471* (2013.01); *H01M 10/0525* (2013.01); *H01M 2004/021* (2013.01); *H01M 2004/027* (2013.01)

(58) Field of Classification Search
CPC .................................................... H01M 4/583
See application file for complete search history.

(56) References Cited

U.S. PATENT DOCUMENTS

| | | | |
|---|---|---|---|
| 2004/0023115 A1 | 2/2004 | Kato et al. | |
| 2005/0221185 A1 | 10/2005 | Sakata et al. | |
| 2015/0303460 A1* | 10/2015 | Murata | H01M 4/583 556/421 |
| 2019/0198857 A1* | 6/2019 | Oh | H01M 4/0471 |

(Continued)

FOREIGN PATENT DOCUMENTS

| CN | 1230159 A | 9/1999 |
|---|---|---|
| CN | 1481041 A | 3/2004 |
| CN | 1574430 A | 2/2005 |

(Continued)

OTHER PUBLICATIONS

WO-2020177623-A1 Translation from Espacenet (Year: 2020).*

(Continued)

*Primary Examiner* — Nathanael T Zemui
(74) *Attorney, Agent, or Firm* — Anova Law Group, PLLC

(57) ABSTRACT

A composite artificial graphite includes a first graphite and a second graphite. The first graphite includes secondary particles and has a graphite interlayer spacing $d_{002}$ of 0.33560 nm to 0.33610 nm. The second graphite includes primary particles and has a graphite interlayer spacing $d_{002}$ of 0.33620 nm to 0.33670 nm. A mass percentage of the first graphite in the composite artificial graphite is 40% to 90%.

15 Claims, 3 Drawing Sheets

(56) References Cited

U.S. PATENT DOCUMENTS

2021/0336244 A1* 10/2021 Kang .................... H01M 4/139

FOREIGN PATENT DOCUMENTS

| | | | |
|---|---|---|---|
| CN | 1677738 | A | 10/2005 |
| CN | 1702892 | A | 11/2005 |
| CN | 1771617 | A | 5/2006 |
| CN | 103165869 | A | 6/2013 |
| CN | 103283068 | A | 9/2013 |
| EP | 0918040 | A1 | 5/1999 |
| JP | 2004127913 | A | 4/2004 |
| JP | 2005044775 | A | 2/2005 |
| JP | 2005317493 | A | 11/2005 |
| JP | 2007173156 | A | 7/2007 |
| WO | WO-2020177623 | A1 * | 9/2020 ........ H01M 10/0525 |

OTHER PUBLICATIONS

The World Intellectual Property Organization (WIPO) International Search Report and written opinion for PCT/CN2021/119709 Feb. 7, 2022 15 pages (including English translation).
The European Patent Office (EPO) Extended Search Report for EP Application No. 21937218.2, Jul. 31, 2023 7 Pages.
Japan Patent Office (JPO) The Notice of Reasons for Refusal For JP Application No. 2022-557066 Nov. 28, 2023 8 Pages (Translation Included).
Japan Patent Office (JPO) Decision to Grant a Patent For JP Application No. 2022-557066 May 21, 2024 5 Pages (including translation).

* cited by examiner

COMPOSITE ARTIFICIAL GRAPHITE AND PREPARATION METHOD THEREOF, AND SECONDARY BATTERY AND POWER CONSUMING DEVICE COMPRISING THE COMPOSITE ARTIFICIAL GRAPHITE

CROSS-REFERENCE TO RELATED APPLICATION

This application is a continuation of International Application No. PCT/CN2021/119709, filed on Sep. 22, 2021, the entire content of which is incorporated herein by reference.

TECHNICAL FIELD

The present application relates to the technical field of secondary batteries, and in particular, to a composite artificial graphite and a preparation method thereof, and a secondary battery and a power consuming device comprising the composite artificial graphite.

BACKGROUND ART

Secondary batteries are widely used due to their outstanding characteristics, such as high energy density, no pollution and long service life.

However, in the secondary batteries, continuous charge and discharge may cause the volume change of negative electrode active materials during the lithium intercalation and de-intercalation processes, for example, the volume expansion during cycling, which leads to an increase of the internal stress of the batteries, thereby affecting the service life and safety performance of the batteries. Recently, with the rapid popularity of new energy vehicles, the market has higher and higher requirements on the service life and safety performance of power secondary batteries. Thus, in order to enhance the market competitiveness of new energy vehicles, it is necessary to provide a new technology that can reduce the volume expansion of secondary batteries.

SUMMARY

The present application is made in light of the above issues, and one objective of the present application is to provide a composite artificial graphite with both low expansion and high gram capacity and a preparation method thereof, as well as a negative electrode plate prepared by using the composite artificial graphite as a negative electrode active material. Further, another objective of the present application is to provide a secondary battery with low volume expansion during cycling and high energy density, and a battery module, a battery pack and a power consuming device comprising the secondary battery.

To achieve the above objectives, a first aspect of the present application provides a composite artificial graphite, comprising a graphite A and a graphite B, wherein the graphite A is secondary particles with a graphite interlayer spacing $d_{002}$ of 0.33560 nm to 0.33610 nm; the graphite B is primary particles with a graphite interlayer spacing $d_{002}$ of 0.33620 nm to 0.33670 nm; and the mass percentage of the graphite A in the composite artificial graphite is 40% to 90%.

In some embodiments, the graphite interlayer spacing $d_{002}$ of the graphite A may be 0.33570 nm to 0.33600 nm, and the graphite interlayer spacing $d_{002}$ of the graphite B may be 0.33630 nm to 0.33660 nm.

In some embodiments, the mass percentage of the graphite A in the composite artificial graphite may be 70% to 90%.

In some embodiments, the volume mean particle size $D_v50$ of the composite artificial graphite may be 11.5 μm to 21.5 μm, optionally 12.0 μm to 20.0 μm, and further optionally 12.0 μm to 16.0 μm.

In some embodiments, the number particle size distribution $D_n10$ of the composite artificial graphite may be 1.3 μm to 6.5 μm, and optionally 2.0 μm to 4.5 μm.

In some embodiments, the powder compacted density of the composite artificial graphite under a pressure of 2000 kg may be 1.55 g/cm$^3$ to 1.85 g/cm$^3$, and optionally 1.65 g/cm$^3$ to 1.80 g/cm$^3$.

In some embodiments, the gram capacity of the composite artificial graphite may be 335 mAh/g or more, and optionally 342 mAh/g or more.

In some embodiments, the volume mean particle size $D_v50$ of the graphite A may be 12.0 μm to 22.0 μm, optionally 14.0 μm to 20.0 μm, and further optionally 14.0 μm to 16.0 μm.

In some embodiments, the number particle size distribution $D_n10$ of the graphite A may be 1.5 μm to 7.5 μm, and optionally 2.5 μm to 4.5 μm.

In some embodiments, the volume mean particle size $D_v50$ of the graphite B may be 8.0 μm to 20.0 μm, and optionally 10.0 μm to 15.0 μm.

In some embodiments, the number particle size distribution $D_n10$ of the graphite B may be 1.2 μm to 6.0 μm, and optionally 1.5 μm to 2.0 μm.

In some embodiments, the degree of graphitization of the graphite A may be 91% to 97%, and optionally 94% to 97%.

In some embodiments, the degree of graphitization of the graphite B may be 85% to 90%, and optionally 86% to 89%.

A second aspect of the present application provides a preparation method of a composite artificial graphite, comprising the following steps:

1) preparation of graphite A:
   S11: a raw material 1 is crushed, graded and then shaped to obtain a precursor 1;
   S12: the precursor 1 obtained in the step S11 is granulated to obtain an intermediate 1; optionally, a binder is or is not added during the granulating process, and when the binder is added, an amount of the binder may be 4% to 16% of the weight of the precursor 1 used in the granulating step S12; and
   S13: the intermediate 1 obtained in the step S12 is graphitized at a temperature of 2800° C. to 3200° C. to obtain the graphite A;
2) preparation of graphite B:
   S21: a raw material 2 is crushed, graded and then shaped to obtain a precursor 2; and
   S22: the precursor 2 obtained in the step S21 is graphitized at a temperature of 2500° C. to 2700° C. to obtain the graphite B; and
3) the graphite A obtained in the step 1) and the graphite B obtained in the step 2) are mixed uniformly in the following mass percentages: 40% to 90% of the graphite A and 10% to 60% of the graphite B, optionally 70% to 90% of the graphite A and 10% to 30% of the graphite B, and further optionally 80% to 90% of the graphite A and 10% to 20% of the graphite B, to obtain the composite artificial graphite, wherein the mass percentages are based on the weight of the composite artificial graphite.

In some embodiments, the graphite A is secondary particles with a graphite interlayer spacing $d_{002}$ of 0.33560 nm to 0.33610 nm, and optionally 0.33570 nm to 0.33600 nm; and the graphite B is primary particles with a graphite interlayer spacing $d_{002}$ of 0.33620 nm to 0.33670 nm, and optionally 0.33630 nm to 0.33660 nm.

In some embodiments, the raw material 1 may include one or more of a needle green petroleum coke, a non-needle green petroleum coke, a needle green coke of coal measures, a non-needle green coke of coal measures, a calcined needle coke, and a calcined petroleum coke; and the raw material 2 may include one or more of a needle green petroleum coke, a non-needle green petroleum coke, a metallurgical coke, a green pitch coke, a needle green coke of coal measures, a non-needle green coke of coal measures, a calcined needle coke, and a calcined petroleum coke.

In some embodiments, the intermediate 1 obtained in the step S12 may be graphitized at a temperature of 3000° C. to 3200° C., and the precursor 2 obtained in the step S21 may be graphitized at a temperature of 2500° C. to 2600° C.

A third aspect of the present application provides a secondary battery, comprising a negative electrode plate comprising a negative electrode active material, the negative electrode active material comprising the composite artificial graphite provided by the first aspect of the present application or the composite artificial graphite prepared according to the method provided by the second aspect of the present application.

A fourth aspect of the present application provides a battery module, comprising the secondary battery provided by the third aspect of the present application.

A fifth aspect of the present application provides a battery pack, comprising the battery module provided by the fourth aspect of the present application.

A sixth aspect of the present application provides a power consuming device, comprising at least one of the secondary battery of the third aspect of the present application, the battery module of the fourth aspect of the present application, or the battery pack of the fifth aspect of the present application.

Beneficial Effects

In the secondary battery provided by the present application, a negative electrode active material comprises a composite artificial graphite comprising a secondary-particle graphite A and a primary-particle graphite B, wherein the graphite A has a graphite interlayer spacing $d_{002}$ of 0.33560 nm to 0.33610 nm and the graphite B has a graphite interlayer spacing $d_{002}$ of 0.33620 nm to 0.33670 nm; and the composite artificial graphite obtained by mixing the both in a particular ratio has a high gram capacity and a low expansion rate during cycling, and enables the secondary battery containing the composite artificial graphite to have significantly reduced volume expansion during cycling (a small volume expansion during cycling of the secondary battery is beneficial for the secondary battery to maintain a high volume energy density; and the low volume expansion can also reduce an internal stress of a cell of the secondary battery and thus the deformation of the cell under the internal stress, such that the safety performance of the secondary battery can be effectively improved), and have a high energy density, such that the safety performance and energy density of the secondary battery can be improved. In addition, the secondary battery with the low volume expansion can maintain an internal structure during the cycle process which is suitable for an electrolyte solution to infiltrate, such that the electrolyte solution can be fully infiltrated into the cell, thereby improving the cycle life of the secondary battery. And also, mixing the graphite B as primary particles with the graphite A as secondary particles can overcome the defect that the secondary-particle graphite alone usually has poor processability and is prone to fall off from a current collector due to a low bonding force with the current collector. The composite artificial graphite obtained by mixing these two graphites has improved processability and has the advantage that it is not easy to fall off due to a high bonding force with the current collector, thus further improving the service life of the secondary battery. The battery module, the battery pack and the power consuming device of the present application comprise the secondary battery provided by the present application, and thus have at least the same advantages as the secondary battery.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

Figure 1:
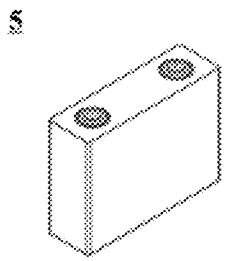
FIG. 1 is a schematic diagram of a secondary battery provided by an embodiment of the present application.

LIST OF REFERENCE NUMERALS 1. battery pack;
2. upper box body;
3. lower box body;
4. battery module;
5. secondary battery.

DETAILED DESCRIPTION OF EMBODIMENTS

Hereafter, embodiments of a composite artificial graphite and a preparation method thereof, a secondary battery, a battery module, a battery pack and a power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed herein are defined in the form of lower and upper limits, where a given range is defined by the selection of a lower limit and an upper limit, and the selected lower and upper limits define the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, in some embodiments sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

In the description herein, it should be noted that, unless otherwise stated, the recitation of numerical ranges by "above" and "below" include all numbers within that range including the endpoints. As used herein, the recitation of "more" in the phrase "one or more" includes two or more.

As a form of energy which is economical, practical, clean and easy to control and convert, electrical energy is increasingly applied in various power consuming devices. Secondary batteries have become preferred power sources for the power consuming devices due to their high energy density, portability, lacking of memory effect, and environmental friendliness. However, the volume expansion of the secondary batteries will occur during the cycle process, which leads to an increase of the internal stress of the batteries and even a risk of failure of the secondary batteries, and also limits the improvement of the energy density of the secondary batteries, thus affecting the service life and safety performance of the batteries. Therefore, how to reduce the volume expansion during cycling of the secondary batteries has become the focus of the technical field of secondary batteries.

The inventors have noticed through numerous studies that a composite artificial graphite obtained by mixing a secondary-particle graphite with a lower graphite interlayer spacing $d_{002}$ and a primary-particle graphite with a higher graphite interlayer spacing $d_{002}$ in a particular ratio can have both a high gram capacity and a low expansion rate, and can reduce the volume expansion during cycling of a secondary battery containing the composite artificial graphite while being beneficial for the secondary battery to maintain a high energy density, such that the service life and safety performance of the secondary battery, and a battery module, a battery pack and a power consuming device comprising the secondary battery can be improved.

[Composite Artificial Graphite]

In a first aspect of the present application, a composite artificial graphite is provided. The composite artificial graphite comprises a graphite A and a graphite B, wherein the graphite A is secondary particles with a graphite interlayer spacing $d_{002}$ of 0.33560 nm to 0.33610 nm; the graphite B is primary particles with a graphite interlayer spacing $d_{002}$ of 0.33620 nm to 0.33670 nm; and the mass percentage of the graphite A in the composite artificial graphite is 40% to 90%.

The inventors have found that when the graphite interlayer spacing $d_{002}$ of the secondary-particle graphite A and the graphite interlayer spacing $d_{002}$ of the primary-particle graphite B in the composite artificial graphite are appropriate, and the percentages of the graphite A and the graphite B in the composite artificial graphite are appropriate, the composite artificial graphite can have both a high gram capacity and significantly reduced expansion during cycling, such that the volume expansion during cycling of a negative electrode plate and a secondary battery comprising the composite artificial graphite can be significantly reduced. A small volume increase during cycling of the secondary battery is beneficial for the secondary battery to maintain a high energy density. In particular, the secondary battery with the low expansion during cycling can maintain an internal structure during the cycle process which is suitable for an electrolyte solution to infiltrate, such that the electrolyte solution is fully infiltrated into the cell, thereby improving the cycle life of the secondary battery. And also, the secondary battery having the low expansion during cycling can also reduce an internal stress of a cell of the secondary battery and thus the deformation of the cell under the internal stress, such that the safety performance of the secondary battery can be effectively improved. Therefore, the safety performance and service life of a battery module, a battery pack and a power consuming device using the secondary battery are also improved.

In some embodiments, the graphite interlayer spacing $d_{002}$ of the graphite A in the composite artificial graphite may be 0.33570 nm to 0.33600 nm, for example, 0.33580 nm to 0.33600 nm, 0.33570 nm to 0.33590 nm, or 0.33580 nm to 0.33590 nm. The graphite interlayer spacing $d_{002}$ of the graphite B may be 0.33630 nm to 0.33660 nm, for example, 0.33630 nm to 0.33650 nm, 0.33640 nm to 0.33660 nm, 0.33630 nm to 0.33640 nm, or 0.33650 nm to 0.33660 nm.

In some embodiments, the mass percentage of the graphite A in the composite artificial graphite may optionally be 70% to 90%, for example, 70%, 80%, 85%, 90%, 75% to 90%, 85% to 90%, or 80% to 85%. The mass percentage of the graphite A in the composite artificial graphite may further optionally be 80% to 90%. By using the graphite A in this mass percentage range, while a high gram capacity of the composite artificial graphite can be maintained, the negative electrode plate and the secondary battery comprising the composite artificial graphite is enabled to have a lower volume expansion during cycling, which is more conducive to the improvement of the energy density and service life of the secondary battery.

In some embodiments, the volume mean particle size $D_v50$ of the composite artificial graphite may be 11.5 μm to 21.5 μm, optionally 12.0 μm to 20.0 μm, and further optionally 12.0 μm to 16.0 μm. An appropriate $D_v50$ of the composite artificial graphite is suitable to make it have a high transport properties of active ions and electrons, and can also reduce side reactions of the electrolyte solution at the negative electrode. The composite artificial graphite with an appropriate $D_v50$ also facilitates the improvement of its own powder compacted density. Using the composite artificial graphite enables the compacted density of the electrode plate to be increased, thus improving the energy density of the secondary battery.

In some embodiments, the number particle size distribution $D_n10$ of the composite artificial graphite may be 1.3 μm to 6.5 μm, for example, the $D_n10$ of the composite artificial graphite may be 1.5 μm to 6.0 μm, 1.5 μm to 5.0 μm, or 2.0 μm to 4.5 μm. The $D_n10$ of the composite artificial graphite being appropriate can make itself have a high gram capacity. In addition, the appropriate $D_n10$ of the composite artificial graphite results in its small active specific surface area, and thus fewer side reactions with the electrolyte solution, such that the expansion during cycling of the secondary battery can be further reduced. Furthermore, in the composite artificial graphite containing an appropriate amount of smaller particles, the smaller particles can be filled in pores between larger particles, such that the composite artificial graphite can also have a high tap density and powder compacted density. Therefore, the negative electrode plate using the composite artificial graphite can obtain a high compacted density of the electrode plate, such that the energy density of the secondary battery can be further improved.

In some embodiments, the powder compacted density of the composite artificial graphite under a pressure of 2000 kg may be 1.55 g/cm$^3$ to 1.85 g/cm$^3$, and optionally 1.65 g/cm$^3$ to 1.80 g/cm$^3$. The powder compacted density being in a suitable range can improve the compacted density of the negative electrode plate, such that the energy density of the secondary battery can be further improved.

In some embodiments, the gram capacity of the composite artificial graphite may be 335 mAh/g or more, for example, 335 mAh/g to 360 mAh/g, and optionally 342 mAh/or more, for example, 342 mAh/g to 360 mAh/g. The higher the gram capacity of the composite artificial graphite, the higher the energy density of the secondary battery containing the same. The composite artificial graphite provided by the present application has a high gram capacity and also a low expansion during cycling, and the combination of the both makes the secondary battery provided by the present application have the properties of both a low expansion during cycling and a high energy density.

In some embodiments, the volume mean particle size $D_v50$ of the graphite A in the composite artificial graphite may be 12.0 μm to 22.0 μm, optionally 14.0 μm to 20.0 μm, and further optionally 14.0 μm to 16.0 μm. the number particle size distribution $D_n10$ of the graphite A may be ≥ 1.5 μm, optionally 1.5 μm to 7.5 μm, and further optionally 2.5 μm to 4.5 μm, for example, 1.5 μm, 1.7 μm, 2.0 μm, 2.5 μm, 3.0 μm, 4.0 μm, 5.0 μm, 6.0 μm, 7.5 μm, 1.5 μm to 6.0 μm, or 3.0 μm to 4.5 μm. When the number particle size distribution $D_n10$ of the secondary-particle graphite A is in the above ranges, the graphite A is enabled to have a high gram capacity, which in turn facilitates the improvement of the gram capacity of the composite artificial graphite, and can inhibit the occurrence of the side reactions during cycling, such that the volume expansion during cycling of the secondary battery is small. When the $D_n10$ of the graphite A is below the above ranges, since there are many small particles, it is not conducive to improving the gram capacity of the composite artificial graphite, and more side reactions during cycling may occur, which causes the volume expansion during cycling of the secondary battery to be larger.

In some embodiments, the volume mean particle size $D_v50$ of the graphite B in the composite artificial graphite may be 8.0 μm to 20.0 μm, and optionally 10.0 μm to 15.0 μm. The number particle size distribution $D_n10$ of the graphite B may be ≥ 1.2 μm, optionally 1.2 μm to 6.0 μm, and further optionally 1.5 μm to 2.0 μm, for example, 1.2 μm, 1.5 μm, 1.7 μm, 2.0 μm, 2.5 μm, 3.0 μm, 4.0 μm, 5.0 μm, 6.0 μm, 1.5 μm to 6.0 μm, or 1.5 μm to 2.0 μm. When the number particle size distribution $D_n10$ of the primary-particle graphite B is in the above ranges, the graphite B is enabled to have a high gram capacity, which in turn facilitates the improvement of the gram capacity of the composite artificial graphite, and can inhibit the occurrence of the side reactions during cycling, such that the volume expansion during cycling of the secondary battery is small.

In some embodiments, the degree of graphitization of the graphite A in the composite artificial graphite may be 91% to 97%, and optionally 94% to 97%; and the degree of graphitization of the graphite B may be 85% to 90%, and optionally 86% to 89%. The degrees of graphitization of the graphite A and the graphite B being in the above ranges can make the composite artificial graphite formed by mixing the both have a high powder compacted density and gram capacity. In particular, the degrees of graphitization being in the above ranges can also make the composite artificial graphite less prone to solvent co-intercalation during the cycle process of the battery, and then a graphite layer is not easy to peel off, thus reducing the expansion during cycling of the electrode plate and the battery. And also, the composite artificial graphite has a high structural stability, so that it is not easy to break up during the rolling process in preparing the negative electrode plate, and thus the cohesion between the particles in the electrode plate is high, thereby reducing the expansion during cycling of the electrode plate and the battery.

[Preparation Method]

In a second aspect of the present application, a preparation method of a composite artificial graphite is provided, by which any of the composite artificial graphites described above can be prepared.

In an embodiment of the present application, a preparation method of a composite artificial graphite is provided, comprising the following steps:

1) preparation of graphite A:

S11: a raw material 1 is crushed, graded and then shaped to obtain a precursor 1;

S12: the precursor 1 obtained in the step S11 is granulated to obtain an intermediate 1; wherein optionally, a binder is or is not added during the granulating process, and when the binder is added, an amount of the binder may be 4% to 16% of the weight of the precursor 1 used in the granulating step S12; and S13: the intermediate 1 obtained in the step S12 is graphitized at a temperature of 2800° C. to 3200° C. to obtain the graphite A;

2) preparation of graphite B:

S21: a raw material 2 is crushed, graded and then shaped to obtain a precursor 2; and S22: the precursor 2 obtained in the step S21 is graphitized at a temperature of 2500° C. to 2700° C. to obtain the graphite B; and 3) the graphite A obtained in the step 1) and the graphite B obtained in the step 2) are mixed uniformly in the following mass percentages: 40% to 90% of the graphite A and 10% to 60% of the graphite B, and optionally 70% to 90% of the graphite A and 10% to 30% of the graphite B, to obtain the composite artificial graphite, wherein the mass percentages are based on the weight of the composite artificial graphite.

In some embodiments, a secondary-particle graphite A with a graphite interlayer spacing $d_{002}$ of 0.33560 nm to 0.33610 nm, and optionally 0.33570 nm to 0.33600 nm, and a primary-particle graphite B with a graphite interlayer spacing $d_{002}$ of 0.33620 nm to 0.33670 nm, and optionally 0.33630 nm to 0.33660 nm are obtained respectively by the step 1) and the step 2) of the preparation method described above. A composite artificial graphite provided in the first aspect of the present application is prepared by mixing the both in a particular ratio.

In some embodiments, the raw material 1 used in the step 1) for preparing the graphite A may include one or more of a needle green petroleum coke, a non-needle green petroleum coke, a needle green coke of coal measures, a non-needle green coke of coal measures, a calcined needle coke, and a calcined petroleum coke. While a metallurgical coke and a green pitch coke are also conventional raw materials for preparing the composite artificial graphite, it is difficult to prepare a graphite A with a desired graphite interlayer spacing by using the metallurgical coke and the green pitch coke as raw materials in the disclosure. The raw material 2 used in the step 2) for preparing the graphite B may include one or more of a needle green petroleum coke, a non-needle green petroleum coke, a metallurgical coke, a green pitch coke, a needle green coke of coal measures, a non-needle green coke of coal measures, a calcined needle coke, and a calcined petroleum coke. The present application uses a combination of the raw materials of the graphite A and the graphite B prepared above, which can ensure that the prepared graphite A and graphite B have preset graphite interlayer spacings $d_{002}$, and also enable the composite artificial graphite obtained by mixing the both in a particular ratio to maintain a high gram capacity and also effectively reduce the volume expansion during cycling of the negative electrode plate and the secondary battery comprising the composite artificial graphite.

In some embodiments, apparatuses and methods known in the art, for example, airflow milling, mechanical milling or roller milling, may be used in both the step S11 and the step S21 to crush the raw materials. The crushing process often produces many excessively small particles, and sometimes there may be excessively large particles, so grading may be performed as demanded after crushing, in order to remove the excessively small and excessively large particles in the powder after crushing. After the grading, a particle product with a good particle size distribution can be obtained, and the particle size distribution such as $D_v50$ can be in a range of 6.0 μm to 16.5 μm, so as to facilitate subsequent shaping and/or granulating processes. The grading may be carried out using apparatuses and methods known in the art, for example, a grading sieve, a gravity grader, a centrifugal grader, etc.

In some embodiments, apparatuses (for example, a shaper or other shaping apparatuses) and methods known in the art are used in the step S11 and the step S21 to shape the particle product obtained after the grading, for example, to grind the particle product obtained by the grading, so as to facilitate subsequent operations, such that the product obtained after the shaping has a high stability.

In some embodiments, fine powder removing after the shaping may be further included in the step S11 and the step S21. By fine powder removing after the shaping, the $D_n10$ of the shaped particle product may be regulated to ≥ 1.2 μm, such that the $D_n10$ of the obtained graphite A and graphite B are in the desired ranges.

The fine powder removing may be carried out using apparatuses and methods known in the art, for example, a grading sieve, a gravity grader, a centrifugal grader, etc.

In some embodiments, the precursor 1 obtained in the step S11 is granulated in the step S12, such that the independently dispersed primary particles are aggregated into secondary particles, thus the graphite A is obtained. In the granulating precess, a binder may or may not be used. For example, when the raw material of the graphite A is a green petroleum coke having volatiles ≥ 10% (the volatiles content of the green coke may be measured by methods known in the art, for example, measured with reference to SH/T 0026-1990), the binder may not be used. When the binder is used, optionally, an amount of the binder may be 4% to 16% of the weight of the precursor 1 used in the granulating step S12.

Apparatuses known in the art may be used in the step S12 for granulation, for example, a granulator. The granulator generally includes a stirred reactor and a module controlling the temperature of the reactor. Further, The volume mean particle size of the product obtained by the granulating (i.e., the intermediate 1) can be controlled by regulating process conditions in the granulating process, such as stirring speed, heating rate, granulating temperature, cooling rate, etc. Optionally, in the present application, the granulating process has a stirring speed of 800 r/min to 1500 r/min, a heating rate of 8° C./min to 15° C./min, a granulating temperature of 400° C. to 650° C., and a granulating time of 6 to 10 hours.

In some embodiments, the intermediate 1 obtained in the step S12 is graphitized at a high temperature in the step S13, to obtain the graphite A with an appropriate degree of graphitization and graphite interlayer spacing. In some embodiments, the temperature at which the graphitization is carried out in the step S13 may be 2800° C. to 3200° C., for example, 2900° C. to 3100° C., or 3000° C. to 3200° C. The graphite A prepared at an appropriate graphitization temperature can achieve an appropriate degree of graphitization and graphite interlayer spacing, such that the composite artificial graphite can achieve a high structural stability and gram capacity, as well as low expansion rate during cycling.

In some embodiments, the precursor 2 obtained in the step S21 is graphitized at a low temperature in the step S22, to obtain the graphite B with an appropriate degree of graphitization and an appropriate graphite interlayer spacing. In some embodiments, the temperature at which the graphitization is carried out in the step S22 may be 2500° C. to 2700° C., for example, 2500° C. to 2600° C., or 2600° C. to 2700° C. The graphite B prepared at an appropriate graphitization temperature can achieve an appropriate degree of graphitization and graphite interlayer spacing, such that the composite artificial graphite can achieve a high structural stability and gram capacity, as well as low expansion rate during cycling.

In the present application, the graphite interlayer spacing $d_{002}$ and the degree of graphitization may be measured using methods known in the art. For example, the degree of graphitization may be measured using an X-ray diffractometer (e.g., Bruker D8 Discover). With reference to JIS K 0131-1996 or JB/T 4220-2011, the magnitude of $d_{002}$ may be measured, and then the degree of graphitization may be calculated according to the formula $G=(0.344-d_{002})/(0.344-0.3354)$, where $d_{002}$ is the interlayer spacing in the artificial graphite crystal structure expressed in nanometers (nm).

In the present application, the $D_n10$ and $D_v50$ of the graphite may be measured with reference to the standard GB/T 19077.1-2016 using a laser particle size analyzer (e.g., Malvern Master Size 3000).

Herein, the physical definitions of $D_n10$ and $D_v50$ are as follows:

$D_n10$: the corresponding particle size when the cumulative number distribution percentage of the graphite reaches 10%; and $D_v50$: the corresponding particle size when the cumulative volume distribution percentage of the graphite reaches 50%.

In the present application, the tap density of the graphite may be measured using methods known in the art. For example, the measurement may be made using a powder tap density tester (e.g., Dandong Bettersize BT-301) with reference to the standard GB/T 5162-2006.

In the present application, the powder compacted density of the graphite may be measured using methods known in the art. For example, it may be measured with reference to GB/T 24533-2009 using an electronic pressure testing machine (e.g., UTM7305): a certain amount of powder is placed on a special mold for compaction and set under different pressures; the thickness of the powder under the different pressures can be read on the apparatus; and then the compacted density under the different pressures can be calculated.

[Secondary Battery]

A third aspect of the present application provides a secondary battery, comprising any one of the composite artificial graphites provided by the first aspect of the present application or any one of the composite artificial graphites prepared according to the method provided by the second aspect of the present application.

In an embodiment of the present application, a secondary battery is provided. Typically, a secondary battery comprises a positive electrode plate, a negative electrode plate, an electrolyte and a separator. During the charge/discharge process of the battery, active ions are intercalated and de-intercalated back and forth between the positive electrode plate and the negative electrode plate. The electrolyte is located between the positive electrode plate and the negative electrode plate and functions for ionic conduction. The separator is provided between the positive electrode plate and the negative electrode plate, and mainly prevents the positive and negative electrodes from short-circuiting and enables ions to pass through.

[Negative Electrode Plate]

The negative electrode plate comprises a negative electrode current collector and a negative electrode film provided on at least one surface of the negative electrode current collector. As an example, the negative electrode current collector has two surfaces opposite in its own thickness direction, and the negative electrode film is provided on either or both of the two opposite surfaces of the negative electrode current collector in a lamination manner.

The negative electrode current collector may be made of a material with good conductivity and mechanical strength, and functions for electrical conduction and current collection. In some embodiments, the negative electrode current collector may be a copper foil.

The negative electrode film comprises a negative electrode active material, and the negative electrode active material comprises any of the composite artificial graphites provided by the first aspect of the present application, and can significantly reduce the volume expansion during cycling of the negative electrode plate of the present application comprising the composite artificial graphite. The low volume expansion not only is beneficial for the secondary battery to maintain a high volume energy density, but also is helpful in reducing an internal stress of a cell of the secondary battery and thus the deformation of the cell under the internal stress, such that the safety performance of the secondary battery is also effectively improved.

In some embodiments, the step of preparing a negative electrode plate using any one or more of the composite artificial graphites of the present application may comprise: a negative electrode active material comprising any one or more of the composite artificial graphites of the present application, a binder and an optional thickener and conductive agent are dispersed in a solvent, which may be deionized water, to form a uniform negative electrode slurry; and the negative electrode slurry is coated onto a negative electrode current collector, and is then subjected to procedures such as drying and cold pressing, so as to obtain the negative electrode plate.

In some embodiments, the negative electrode film may also optionally comprise other negative electrode active materials that may be used for the negative electrode of secondary batteries. Other negative electrode active materials may be one or more of other graphite materials (e.g., other artificial graphites, or natural graphites), mesophase carbon micro beads (abbreviated as MCMB), hard carbon, soft carbon, silicon-based materials, and tin-based materials.

In some embodiments, the binder may be selected from one or more of polyacrylic acid (PAA), sodium polyacrylate (PAAS), polyacrylamide (PAM), polyvinyl alcohol (PVA), a butadiene styrene rubber (SBR), sodium alginate (SA), polymethacrylic acid (PMAA) and carboxymethyl chitosan (CMCS).

In some embodiments, the thickener may be sodium carboxymethyl cellulose (CMC-Na).

In some embodiments, the conductive agent for the negative electrode plate may be selected from one or more of graphite, superconducting carbon, acetylene black, carbon black, Ketjen black, carbon dots, carbon nanotubes, graphene and carbon nanofibers.

[Positive Electrode Plate]

The positive electrode plate comprises a positive electrode current collector and a positive electrode film which is provided on at least one surface of the positive electrode current collector and comprises a positive electrode active material. As an example, the positive electrode current collector has two surfaces opposite in its own thickness direction, and the positive electrode film is provided on either or both of the two opposite surfaces of the positive electrode current collector in a lamination manner.

The positive electrode current collector may be made of a material with good conductivity and mechanical strength. In some embodiments, the positive electrode current collector may be an aluminum foil.

The specific types of the positive electrode active materials are not limited specifically in the present application, and materials known in the art that can be used for the positive electrode of the secondary battery may be used, and the materials may be selected by those skilled in the art according to actual requirements.

In some embodiments, the secondary battery may be a lithium-ion secondary battery. The positive electrode active material may be selected from lithium transition metal oxides and modified materials thereof, and the modified materials can be those from doping modification and/or coating modification of the lithium transition metal oxides. For example, the lithium transition metal oxides may be selected from one or more of lithium cobalt oxides, lithium nickel oxides, lithium manganese oxides, lithium nickel manganese oxides, lithium nickel cobalt manganese oxides, lithium nickel cobalt aluminum oxides, and lithium containing phosphates of olivine structure.

As an example, the positive electrode active material of the secondary battery may be selected from one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$(NCM523), $LiNi_{0.6}Co_{0.2}Mn_{0.2}O_2$(NCM622), $LiNi_{0.8}Co_{0.1}Mn_{0.1}O_2$ (NCM811), $LiNi_{0.85}Co_{0.15}Al_{0.05}O_2$, $LiFePO_4$(LFP) and $LiMnPO_4$.

In some embodiments, the positive electrode film may also optionally comprise a binder. The type of the binder is not limited specifically, and may be selected by those skilled in the art according to actual requirements. An example, the binder for the positive electrode film may include one or more of polyvinylidene fluoride (PVDF) and polytetrafluoroethylene (PTFE).

In some embodiments, the positive electrode film may also optionally comprises a conductive agent. The type of the conductive agent is not limited specifically, and may be selected by those skilled in the art according to actual requirements. As an example, the conductive agent for the positive electrode film may include one or more of graphite, superconducting carbon, acetylene black, carbon black, Ketjen black, carbon dots, carbon nanotubes, graphene and carbon nanofibers.

[Electrolyte]

The electrolyte is located between the positive electrode plate and the negative electrode plate and functions for ionic conduction. The type of the electrolyte in the present application is not specifically limited, and may be selected according to actual requirements. For example, the electrolyte may be liquid, gel or all solid.

In some embodiments, the electrolyte may be an electrolyte solution. The electrolyte solution comprises an electrolyte salt and a solvent.

In some embodiments, the electrolyte salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium bisoxalatodifluorophosphate) and LiTFOP (lithium tetrafluorooxalate phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS) and diethyl sulfone (ESE).

In some embodiments, the electrolyte solution may optionally comprise an additive. For example, the additive can include a negative electrode film-forming additive, a positive electrode film-forming additive, and also an additive that can improve certain performance of the battery, such as an additive to improve the overcharge performance of a battery, an additive to improve the high temperature performance of a battery, and an additive to improve the low temperature performance of a battery, etc.

[Separator]

The secondary battery using an electrolyte solution and some secondary batteries using a solid electrolyte further comprise a separator. The separator is provided between the positive electrode plate and the negative electrode plate, and functions for separation. The type of the separator is not particularly limited in the present application, and any well known porous-structure separator with good chemical stability and mechanical stability may be selected. In some embodiments, the material of the separator may be selected from one or more of glass fibers, a non-woven, polyethylene, polypropylene and polyvinylidene fluoride. The separator may be a single-layer film, or a multi-layer composite film. When the separator is a multi-layer composite film, the materials of the respective layers may be the same or different.

[Outer Package]

In some embodiments, the secondary battery may comprise an outer package for encapsulating the positive electrode plate, the negative electrode plate and the electrolyte. As an example, the positive electrode plate, the negative electrode plate and the separator may be laminated or wound to form a laminated or wrapped-structure cell, which is encapsulated within the outer package. The electrolyte may be an electrolyte solution which is infiltrated into the cell. The number of the cells in the secondary battery may be one or more, and can be adjusted according to the requirements.

In some embodiments, the outer package of the secondary battery may be a soft bag, such as a pouch-type soft bag. The material of the soft bag can be a plastic, for example, comprising one or more of polypropylene PP, polybutylene terephthalate PBT, polybutylene succinate PBS, etc. The outer package of the secondary battery may also be a hard shell, such as an aluminum shell, etc.

In some embodiments, the positive electrode plate, the negative electrode plate and the separator may form an electrode assembly by a winding process or a laminating process.

The shape of the secondary battery is not particularly limited in the present application, and may be cylindrical, square or of any other shape. FIG. 1 shows a square secondary battery 5 as an example.

[Battery Module]

In a fourth aspect of the present application, a battery module may be formed by assembling secondary batteries, and the number of the secondary batteries contained in the battery module may be more than one, and the specific number may be adjusted according to the application and capacity of the battery module.

Figure 2:
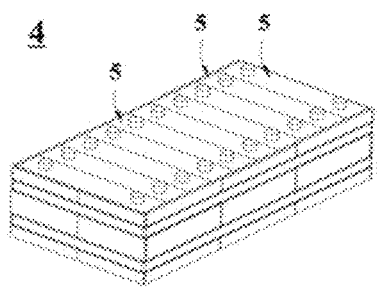
FIG. 2 is a schematic diagram of a battery module provided by an embodiment of the present application.

FIG. 2 shows a battery module 4 as an example. Referring to FIG. 2, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and the plurality of secondary batteries 5 are accommodated in the accommodating space.

[Battery Pack]

In a fifth aspect of the present application, a battery pack may also be formed by assembling the battery modules provided by the fourth aspect of the present application, and the number of the battery modules contained in the battery pack may be adjusted according to the application and capacity of the battery pack.

Figure 3:
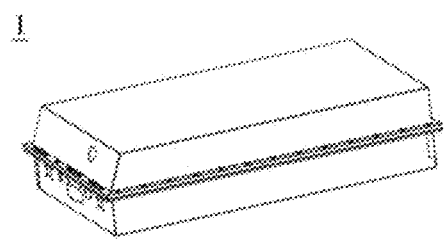
FIG. 3 is a schematic diagram of a battery pack provided by an embodiment of the present application.
Figure 4:
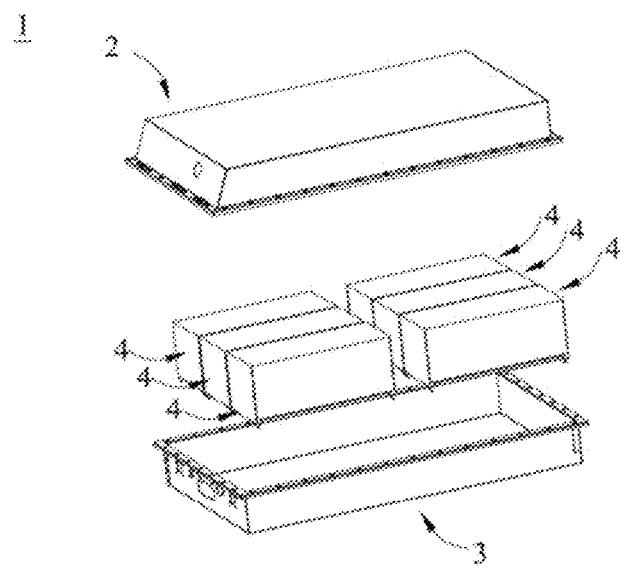
FIG. 4 is an exploded view of FIG. 3.

FIG. 3 and FIG. 4 show a battery pack 1 as an example. Referring to FIG. 3 and FIG. 4, the battery pack 1 may include a battery box and a plurality of battery modules 4 provided in the battery box. The battery box comprises an upper box body 2 and a lower box body 3, wherein the upper box body 2 can cover the lower box body 3 to form a closed space for accommodating the battery modules 4. A plurality of battery modules 4 may be arranged in the battery box in any manner.

[Power Consuming Device]

A sixth aspect of the present application provides a power consuming device, comprising the secondary battery of the third aspect of the present application, which provides a power source for the power consuming device. The power consuming device may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, ship and satellite, an energy storage system, and the like.

The power consuming device may incorporate the secondary battery, battery module or battery pack according to its usage requirements.

Figure 5:
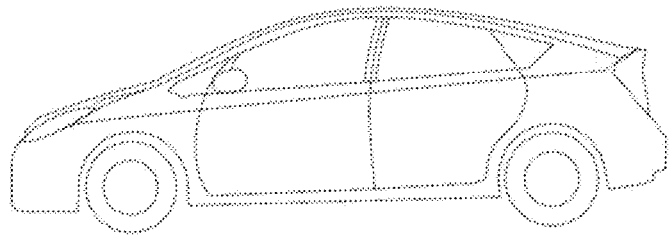
FIG. 5 is a schematic diagram of a power consuming device provided by an embodiment of the present application.

FIG. 5 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

As another example, the power consuming device may be a mobile phone, a tablet, a laptop computer, etc. The power consuming device is generally required to be thin and light, and may use a secondary battery as a power source.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. The reagents or instruments used, if they are not marked with the manufacturer, are common products that are commercially available.

[Performance Test]

(1) Test of Gram Capacity of Composite Artificial Graphite

A prepared composite artificial graphite, a conductive agent Super P, a thickener CMC-Na, and a binder SBR were mixed uniformly in a mass ratio of 94.5:1.5:1.5:2.5 with a solvent deionized water, to form a slurry; the prepared slurry was coated onto an aluminum foil current collector, and dried in an oven for later use; a lithium metal sheet was used as a counter electrode; a polyethylene (PE) film was used as a separator; ethylene carbonate (EC), ethyl methyl carbonate (EMC), and diethyl carbonate (DEC) were mixed in a volume ratio of 1:1:1, and then LiPF6 was uniformly dissolved in the above solution to obtain an electrolyte solution, where the concentration of LiPF6 was 1 mol/L; and the above parts were assembled into a CR2430 type button battery in an argon gas-protected glove box.

After standing for 12 hours, the obtained button battery was constant-current discharged to 0.005 V at a current of 0.05 C, allowed to stand for 10 minutes, and then constant-current discharged to 0.005 V at a current of 10 μA; then, the battery was constant-current charged to 2 V at a current of 0.1 C, and the charging capacity was recorded. The ratio of the charging capacity to the mass of the composite artificial graphite was the gram capacity of the prepared composite artificial graphite.

(2) Test of Expansion Rate During Cycling of Negative Electrode Plate

The thickness of the negative electrode plate after cold pressing was recorded as H0. A secondary battery was formed by using the cold pressed negative electrode plate with a positive electrode plate, a separator, and an electrolyte solution. The secondary battery was subjected to a 1 C/1 C cycle with a 100% DOD (a 100% depth of discharge, namely, full charge and then full discharge) at 45° C. in a Neware charge and discharge machine. The discharge capacity (i.e., initial capacity) of the first cycle was recorded as 100%, and the cycle was stopped when the capacity retention rate during cycling was 80% of the initial capacity. Then, the secondary battery was charged to 100% SOC (State of Charge), then the secondary battery was disassembled, and the thickness of the corresponding negative electrode plate was measured and recorded as H1. Then, the expansion rate during cycling of the negative electrode plate was: $(H1/H0-1) \times 100\%$.

(3) Capacity Retention Rate During Cycling

A charge and discharge test was performed on a lithium ion battery at 45° C. One charge and discharge cycle precess was as follows: The battery was constant-current charged to 4.3 V at a current of 1 C, then constant-voltage charged to a current of 0.05 C at 4.3 V, allowed to stand for 5 min, then constant-current discharged to 2.8 V at a current of 1 C, and the capacity of the battery at this time was recorded as C1. The above was one charge and discharge cycle of the battery. The above process was repeated 1200 times, and the capacity C1200 of the battery at this time was recorded. Then, the capacity retention rate during cycling=$C1200/C1 \times 100\%$.

Example 1

Preparation of Composite Artificial Graphite

1) Preparation of graphite A:

S11: A calcined needle coke was crushed by a roller milling to a $D_v50$ of 10.0 μm, shaped and then removed of fine powder, to obtain a precursor 1;

S12: the precursor 1 obtained in the step S11 was added into a reactor and 12% of a binder pitch based on the weight of the precursor 1 used for graphitization was added for graphitization; and the mixture was stirred with a speed of 1200 r/min, heated to 560° C. with a rate of 10° C./min at room temperature and maintained at this constant temperature for 8 hours, and then granulated to a $D_v50$ of 17.2 to obtain an intermediate 1; and S13: the intermediate 1 obtained in the step S12 was added into a graphitization furnace, and heated to 3000° C. for high temperature graphitization, to obtain a graphite A with a $D_v50$ of 15.6 µm. The graphite A was secondary particles with a graphite interlayer spacing $d_{002}$ as shown in Table 1 below.

2) Preparation of graphite B:

S21: A needle green petroleum coke was crushed by mechanical milling to a $D_v50$ of 11.2 µm, shaped and then removed of fine powder, to obtain a precursor 2; and S22: the precursor 2 obtained in the step S21 was added into a graphitization furnace, and headed to 2500° C. for low temperature graphitization, to obtain a graphite B with a $D_v50$ of 10.0 µm. The graphite B was primary particles with a graphite interlayer spacing $d_{002}$ as shown in Table 1 below.

Figure 6A:
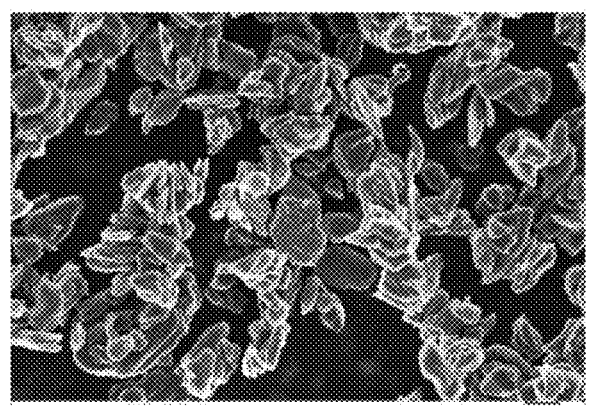
FIGS. 6a-6c are scanning electron microscope (SEM) pictures of the composite artificial graphites provided by Example 1, Example 2 and Example 3 of the present application, respectively.

3) Preparation of composite graphite: The graphite A and the graphite B was mixed uniformly in a mass ratio of 75%:25%, to obtain a composite artificial graphite. The gram capacity of the composite artificial graphite is as shown in Table 2 below, and an SEM picture of the composite artificial graphite is as shown in FIG. 6a. As shown in FIG. 6a, the primary-particle graphite B is a single bulky particle; and the secondary-particle graphite A is composed of two or more bulky particles bonded together.

Preparation of Negative Electrode Plate

The prepared composite artificial graphite described above, a conductive agent Super P, a binder SBR, and a thickener CMC-Na were fully stirred and mixed in an appropriate amount of deionized water in a mass ratio of 96.2:0.8:1.8:1.2, to form a uniform negative electrode slurry; and the negative electrode slurry was coated onto a surface of a negative electrode current collector of copper foil, followed by drying and cold pressing, to obtain a negative electrode plate. The negative electrode plate has a compacted density of 1.65 g/cm³ and a surface density of 10.7 mg/cm². Results of the expansion rate during cycling of the negative electrode plate and results of the capacity retention rate during cycling of the secondary battery are as shown in Table 2 below.

Preparation of Positive Electrode Plate

A positive electrode active material $LiNi_{0.5}Co_{0.2}Mn_{0.3}O_2$ (NCM523), a conductive agent Super P, and a binder PVDF were fully stirred and mixed in an appropriate amount of NMP in a mass ratio of 96.2:2.7:1.1, to form a uniform positive electrode slurry; and the positive electrode slurry was coated onto a surface of a positive electrode current collector of aluminum foil, followed by drying and cold pressing, to obtain a positive electrode plate. The positive electrode plate has a compacted density of 3.45 g/cm³ and a surface density of 18.8 mg/cm'.

Preparation of Electrolyte Solution

Ethylene carbonate (EC), ethyl methyl carbonate (EMC), and diethyl carbonate (DEC) were mixed in a volume ratio of 1:1:1, and then $LiPF_6$ was uniformly dissolved in the above solution to obtain an electrolyte solution, where the concentration of $LiPF_6$ was 1 mol/L.

Separator

A polyethylene (PE) film was used.

Preparation of Secondary Battery

A positive electrode plate, a separator, and a negative electrode plate were stacked in order, followed by winding, to obtain a cell. The cell was put into an outer package and the above electrolyte solution was added in, followed by processes such as encapsulating, standing, forming, aging, etc., to obtain a secondary battery. The outer package was selected as a hard-shell housing with a length*width*height=148 mm*28.5 mm*97.5 mm.

Examples 2-11

Figure 6B:
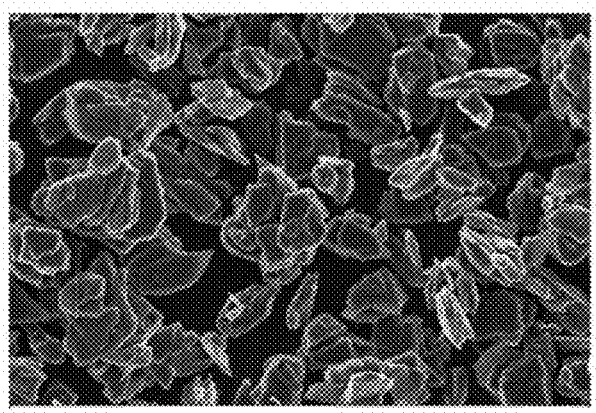
Figure 6C:
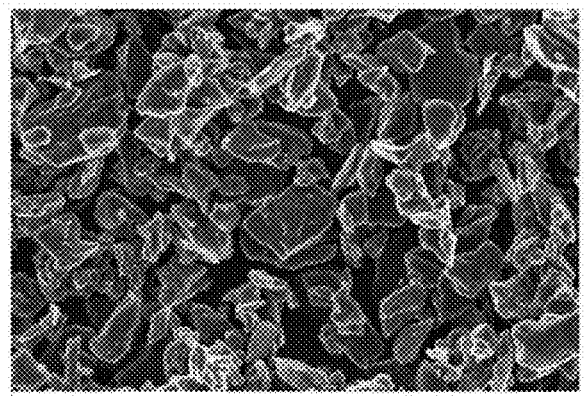

Preparation methods of Examples 2-5 were similar to that of Example 1, except that: the raw materials and the graphitization temperatures for preparing the graphite A and the graphite B were adjusted. Test results of process parameters and physical parameters of the graphite A and the graphite B of the respective examples are as shown in Table 1 below, and test results of the gram capacity of the obtained composite artificial graphite, as well as test results of the expansion rate during cycling of the negative electrode plate and results of the capacity retention rate during cycling of the secondary battery are as shown in Table 2 below. FIG. 6b and FIG. 6c are SEM pictures of Example 2 and Example 3, respectively.

Preparation methods of Examples 6-11 were similar to that of Example 1, except that: the mass ratios of graphite A to the graphite B were adjusted to 90%:10%, 80%:20%, 70%:30%, 60%:40%, 50%:50% and 40%:60%, respectively. Test results of process parameters and physical parameters of the graphite A and the graphite B of the respective examples are as shown in Table 1 below, and test results of the gram capacity of the obtained composite artificial graphite, as well as test results of the expansion rate during cycling of the negative electrode plate and results of the capacity retention rate during cycling of the secondary battery are as shown in Table 2 below.

Comparative Examples 1-14

Preparation methods of Comparative examples 1-4 were similar to that of Example 1, except that: the process parameters for preparing the graphite B were regulated, to obtain different composite artificial graphites. Test results of process parameters and physical parameters of the graphite A and the graphite B of the respective comparative examples are as shown in Table 1 below, and test results of the gram capacity of the obtained composite artificial graphite, as well as test results of the expansion rate during cycling of the negative electrode plate and results of the capacity retention rate during cycling of the secondary battery are as shown in Table 2 below. Specifically: The raw materials for preparing the graphite B in Comparative Examples 1 to 4 were a needle green petroleum coke, a calcined petroleum coke, or a calcined needle coke, and the graphitization temperatures were adjusted, to obtain different primary particles.

Preparation methods of Comparative examples 5 to 8 were similar to that of Example 1, except that: The raw materials for the graphites, the process parameters of preparation, and the mixing ratios were regulated, to obtain different composite artificial graphites. Test results of process parameters and physical parameters of the graphite A and the graphite B of the respective comparative examples are as shown in Table 1 below, and test results of the gram capacity of the obtained composite artificial graphite, as well as test results of the expansion rate during cycling of the secondary battery and results of the capacity retention rate during cycling of the secondary battery are as shown in Table 2 below.

Specifically, the raw material for preparing the graphite A in Comparative Example 5 was a green pitch coke, and the graphitization temperature was adjusted, to obtain secondary particles with a large graphite interlayer spacing. The raw material for preparing the graphite B was a green pitch coke, and primary particles with a large graphite interlayer spacing were obtained.

The raw material for preparing the graphite A in Comparative Example 6 was a needle green petroleum coke, a binder pitch was not added during the granulating process, and the graphitization temperature was adjusted, to obtain secondary particles with a large graphite interlayer spacing. The raw material for preparing the graphite B was a needle green petroleum coke, and primary particles with a large graphite interlayer spacing were obtained. The mixing ratio of the graphite A to the graphite B was adjusted to 60%:40%.

The raw material for preparing the graphite A in Comparative Example 7 was a needle green petroleum coke, a binder pitch was not added during the granulating process, and the graphitization temperature was adjusted, to obtain secondary particles with a large graphite interlayer spacing. The raw material for preparing the graphite B was a calcined needle coke, and primary particles with a large graphite interlayer spacing were obtained. The mixing ratio of the graphite A to the graphite B was adjusted to 50%:50%.

The raw material for preparing the graphite A in Comparative Example 8 was a needle green petroleum coke, and the graphitization temperature was adjusted, to obtain secondary particles with a large graphite interlayer spacing. The raw material for preparing the graphite B was a needle green petroleum coke, and primary particles with a large graphite interlayer spacing were obtained. The mixing ratio of the graphite A to the graphite B was adjusted to 40%:60%.

Preparation methods of Comparative examples 9 to 10 were similar to that of Example 1, except that: the mixing ratios of the graphite A to the graphite B were regulated, to obtain different composite artificial graphites. Test results of process parameters and physical parameters of the graphite A and the graphite B of the respective comparative examples are as shown in Table 1 below, and test results of the gram capacity of the obtained composite artificial graphite, as well as test results of the expansion rate during cycling of the negative electrode plate and results of the capacity retention rate during cycling of the secondary battery are as shown in Table 2 below.

Specifically, in Comparative Example 9, the mixing ratio of the graphite A to the graphite B was adjusted to 95%:5%.

In Comparative Example 10, the mixing ratio of the graphite A to the graphite B was adjusted to 30%:70%.

Preparation methods of Comparative examples 11 to 12 were similar to that of Example 1, except that: the preparations of the graphite A and the graphite B were regulated to use the same raw material and the same graphitization temperature, to obtain different composite artificial graphites. Test results of process parameters and physical parameters of the graphite A and the graphite B of the respective comparative examples are as shown in Table 1 below, and test results of the gram capacity of the obtained composite artificial graphite, as well as test results of the expansion rate during cycling of the negative electrode plate and results of the capacity retention rate during cycling of the secondary battery are as shown in Table 2 below.

Specifically, in Comparative Example 11, the raw materials for preparing the graphite A and the graphite B both were a needle green petroleum coke, and the graphitization temperatures both were 2700° C.

In Comparative Example 12, the raw materials for preparing the graphite A and the graphite B both were a calcined needle coke, and the graphitization temperatures both were 3000° C.

Preparation methods of Comparative examples 13 to 14 were similar to that of Example 1, except that: the raw materials of the graphite A were regulated, to obtain different composite artificial graphites. Test results of process parameters and physical parameters of the graphite A and the graphite B of the respective comparative examples are as shown in Table 1 below, and test results of the gram capacity of the obtained composite artificial graphite, as well as test results of the expansion rate during cycling of the negative electrode plate and results of the capacity retention rate during cycling of the secondary battery are as shown in Table 2 below.

Specifically, in Comparative Example 13, the raw material for preparing the graphite A was a metallurgical coke; and in Comparative Example 14, the raw material for preparing the graphite A was a green pitch coke.

TABLE 1

Test results of process parameters and physical parameters of Examples 1-11 vs. Comparative examples 1-14

| Examples | Raw material Graphite A | Raw material Graphite B | Graphitization temperature (° C.) Graphite A | Graphitization temperature (° C.) Graphite B | Graphite interlayer spacing [nm] Graphite A | Graphite interlayer spacing [nm] Graphite B | $D_n10$ [µm] Graphite A | $D_n10$ [µm] Graphite B | $D_v50$ [µm] Graphite A | $D_v50$ [µm] Graphite B | Degree of graphitization Graphite A | Degree of graphitization Graphite B |
|---|---|---|---|---|---|---|---|---|---|---|---|---|
| Example 1 | Calcined needle coke | Needle green petroleum coke | 3000 | 2500 | 0.33580 | 0.33635 | 4.5 | 1.5 | 15.6 | 10.0 | 95.3% | 89.0% |
| Example 2 | Calcined needle coke | Green pitch coke | 3200 | 2600 | 0.33569 | 0.33640 | 4.5 | 2.0 | 16.0 | 12.0 | 96.6% | 88.4% |
| Example 3 | Needle green petroleum coke | Green pitch coke | 3000 | 2600 | 0.33592 | 0.33640 | 2.5 | 1.5 | 16.0 | 12.0 | 94.0% | 88.4% |
| Example 4 | Calcined needle coke | Metallurgical coke | 3200 | 2500 | 0.33569 | 0.33655 | 4.5 | 1.5 | 16.0 | 15.0 | 96.6% | 86.6% |
| Example 5 | Needle green petroleum coke | Metallurgical coke | 3000 | 2500 | 0.33592 | 0.33655 | 2.5 | 2.0 | 16.0 | 15.0 | 94.0% | 86.6% |
| Example 6 | Calcined needle coke | Needle green petroleum coke | 3000 | 2500 | 0.33580 | 0.33635 | 4.5 | 1.5 | 15.6 | 10.0 | 95.3% | 89.0% |
| Example 7 | Calcined needle coke | Needle green petroleum coke | 3000 | 2500 | 0.33580 | 0.33635 | 4.5 | 1.5 | 15.6 | 10.0 | 95.3% | 89.0% |
| Example 8 | Calcined needle coke | Needle green petroleum coke | 3000 | 2500 | 0.33580 | 0.33635 | 4.5 | 1.5 | 15.6 | 10.0 | 95.3% | 89.0% |

TABLE 1-continued

Test results of process parameters and physical parameters of Examples 1-11 vs. Comparative examples 1-14

| Examples | Raw material | | Graphitization temperature (° C.) | | Graphite interlayer spacing [nm] | | $D_n10$ [μm] | | $D_v50$ [μm] | | Degree of graphitization | |
|---|---|---|---|---|---|---|---|---|---|---|---|---|
| | Graphite A | Graphite B | Graphite A | Graphite B | Graphite A | Graphite B | Graphite A | Graphite B | Graphite A | Graphite B | Graphite A | Graphite B |
| Example 9 | Calcined needle coke | Needle green petroleum coke | 3000 | 2500 | 0.33580 | 0.33635 | 4.5 | 1.5 | 15.6 | 10.0 | 95.3% | 89.0% |
| Example 10 | Calcined needle coke | Needle green petroleum coke | 3000 | 2500 | 0.33580 | 0.33635 | 4.5 | 1.5 | 15.6 | 10.0 | 95.3% | 89.0% |
| Example 11 | Calcined needle coke | Needle green petroleum coke | 3000 | 2500 | 0.33580 | 0.33635 | 4.5 | 1.5 | 15.6 | 10.0 | 95.3% | 89.0% |
| Comparative example 1 | Calcined needle coke | Needle green petroleum coke | 3000 | 3000 | 0.33580 | 0.33595 | 4.5 | 1.8 | 15.6 | 10.0 | 95.3% | 93.6% |
| Comparative example 2 | Calcined needle coke | Needle green petroleum coke | 3000 | 3100 | 0.33580 | 0.33592 | 4.5 | 2.0 | 15.6 | 10.0 | 95.3% | 94.0% |
| Comparative example 3 | Calcined needle coke | Calcined petroleum coke | 3000 | 3100 | 0.33580 | 0.33580 | 4.5 | 2.3 | 15.6 | 10.0 | 95.3% | 95.3% |
| Comparative example 4 | Calcined needle coke | Calcined needle coke | 3000 | 3200 | 0.33580 | 0.33569 | 4.5 | 4.1 | 15.6 | 10.0 | 95.3% | 96.6% |
| Comparative example 5 | Green pitch coke | Green pitch coke | 2700 | 2500 | 0.33630 | 0.33670 | 2.0 | 3.3 | 15.6 | 10.0 | 89.5% | 84.9% |
| Comparative example 6 | Needle green petroleum coke | Needle green petroleum coke | 2650 | 2700 | 0.33637 | 0.33620 | 1.9 | 1.9 | 15.6 | 10.0 | 88.7% | 90.7% |
| Comparative example 7 | Needle green petroleum coke | Calcined needle coke | 2600 | 2600 | 0.33662 | 0.33635 | 3.1 | 1.8 | 15.6 | 10.0 | 85.8% | 89.0% |
| Comparative example 8 | Needle green petroleum coke | Needle green petroleum coke | 2600 | 2700 | 0.33662 | 0.33620 | 3.2 | 1.9 | 15.6 | 10.0 | 85.8% | 90.7% |
| Comparative example 9 | Calcined needle coke | Needle green petroleum coke | 3000 | 2500 | 0.33580 | 0.33635 | 4.5 | 1.5 | 15.6 | 10.0 | 95.3% | 89.0% |
| Comparative example 10 | Calcined needle coke | Needle green petroleum coke | 3000 | 2500 | 0.33580 | 0.33635 | 4.5 | 1.5 | 15.6 | 10.0 | 95.3% | 89.0% |
| Comparative example 11 | Needle green petroleum coke | Needle green petroleum coke | 2700 | 2700 | 0.33620 | 0.33620 | 1.9 | 1.9 | 15.6 | 10.0 | 90.7% | 90.7% |
| Comparative example 12 | Calcined needle coke | Calcined needle coke | 3000 | 3000 | 0.33580 | 0.33580 | 4.5 | 4.5 | 15.6 | 10.0 | 95.3% | 95.3% |
| Comparative example 13 | Metallurgical coke | Needle green petroleum coke | 3000 | 2500 | 0.33630 | 0.33635 | 2.0 | 1.5 | 15.6 | 10.0 | 89.5% | 89.0% |
| Comparative example 14 | Green pitch coke | Needle green petroleum coke | 3000 | 2500 | 0.33630 | 0.33635 | 2.0 | 1.5 | 15.6 | 10.0 | 89.5% | 89.0% |

TABLE 2

Performance test results of Examples 1-11 vs. Comparative examples 1-14

| Examples | Mass ratio of graphite A to graphite B | $D_v50$ of composite artificial graphite [μm] | $D_n10$ of composite artificial graphite [μm] | Powder compacted density under pressure of 2000 kg [g/cm³] | Gram capacity of composite artificial graphite [mAh/g] | Performance: expansion rate during cycling [%] | Capacity retention rate during cycling of secondary battery |
|---|---|---|---|---|---|---|---|
| Example 1 | 75%:25% | 14.2 | 3.8 | 1.77 | 352.5 | 27.4 | 92.1% |
| Example 2 | 75%:25% | 15.0 | 3.9 | 1.78 | 353.8 | 28.4 | 91.8% |
| Example 3 | 75%:25% | 15.0 | 2.3 | 1.70 | 344.0 | 27.3 | 92.5% |
| Example 4 | 75%:25% | 15.8 | 3.8 | 1.78 | 352.5 | 28.6 | 91.5% |
| Example 5 | 75%:25% | 15.8 | 2.4 | 1.69 | 342.8 | 28.0 | 92.4% |
| Example 6 | 90%:10% | 15.0 | 4.2 | 1.80 | 357.0 | 27.0 | 92.3% |
| Example 7 | 80%:20% | 14.5 | 3.9 | 1.78 | 354.0 | 27.2 | 92.2% |
| Example 8 | 70%:30% | 13.9 | 3.6 | 1.75 | 351.0 | 27.5 | 92.0% |
| Example 9 | 60%:40% | 13.4 | 3.3 | 1.73 | 348.0 | 28.0 | 91.9% |
| Example 10 | 50%:50% | 12.8 | 3.0 | 1.71 | 345.0 | 28.4 | 91.8% |
| Example 11 | 40%:60% | 12.2 | 2.7 | 1.69 | 342.0 | 28.6 | 91.7% |
| Comparative example 1 | 75%:25% | 14.2 | 3.8 | 1.78 | 357.5 | 34.8 | 89.1% |
| Comparative example 2 | 75%:25% | 14.2 | 3.9 | 1.79 | 358.0 | 35.5 | 89.0% |
| Comparative example 3 | 75%:25% | 14.2 | 4.0 | 1.79 | 360.0 | 36.5 | 88.9% |

TABLE 2-continued

Performance test results of Examples 1-11 vs. Comparative examples 1-14

| Examples | Mass ratio of graphite A to graphite B | $D_v50$ of composite artificial graphite [μm] | $D_n10$ of composite artificial graphite [μm] | Powder compacted density under pressure of 2000 kg [g/cm³] | Gram capacity of composite artificial graphite [mAh/g] | Performance: expansion rate during cycling [%] | Capacity retention rate during cycling of secondary battery |
|---|---|---|---|---|---|---|---|
| Comparative example 4 | 75%:25% | 14.2 | 4.4 | 1.81 | 361.2 | 37.5 | 88.8% |
| Comparative example 5 | 75%:25% | 14.2 | 2.3 | 1.57 | 325.0 | 27.0 | 92.3% |
| Comparative example 6 | 60%:40% | 13.4 | 2.1 | 1.54 | 324.0 | 27.4 | 92.1% |
| Comparative example 7 | 50%:50% | 12.8 | 2.5 | 1.50 | 311.0 | 27.2 | 92.2% |
| Comparative example 8 | 40%:60% | 12.2 | 2.5 | 1.54 | 320.0 | 27.3 | 92.0% |
| Comparative example 9 | 95%:5% | 15.3 | 4.4 | 1.81 | 358.5 | / | / |
| Comparative example 10 | 30%:70% | 11.7 | 2.4 | 1.67 | 339.0 | 33.1 | 91.0% |
| Comparative example 11 | 40%:60% | 12.2 | 1.9 | 1.62 | 342.0 | 33.5 | 90.0% |
| Comparative example 12 | 50%:50% | 12.8 | 4.5 | 1.83 | 360.0 | 35.5 | 89.0% |
| Comparative example 13 | 75%:25% | 14.2 | 1.9 | 1.62 | 337.5 | 29.2 | 91.2% |
| Comparative example 14 | 75%:25% | 14.2 | 1.9 | 1.62 | 337.5 | 29.1 | 91.1% |

From comparison of Examples 1-11 and Comparative Examples 1-14 shown in Table 1 above and Table 2 above, the composite artificial graphites obtained by mixing the secondary-particle graphite A with the smaller graphite interlayer spacing and the primary-particle graphite B with the larger graphite interlayer spacing in particular ratios have a high gram capacity, and can also effectively reduce the expansion rate during cycling of the negative electrode plate, such that while a high energy density of the secondary battery is maintained, the volume expansion during cycling of the secondary battery is effectively reduced, and the reduced volume expansion in turn helps the secondary battery to have a higher energy density, thus effectively improving the service life and safety performance of the secondary battery.

In Comparative Examples 1-4, the preparing processes of the graphite A and the graphite B both use high temperatures. While the gram capacities of the obtained composite artificial graphites are high, the expansion rates during cycling of the negative electrode plates are large, thereby seriously degrading their cycle performance and being unfavorable to the service lives of the secondary batteries.

In Comparative Examples 5-8, the preparing processes of the graphite A and the graphite B both use low temperatures. While using the obtained composite artificial graphites to prepare the negative electrode plates can effectively reduce the expansion rates during cycling of the electrode plates, the composite artificial graphites have low gram capacities and low powder compacted densities, which significantly reduce the energy densities of the secondary batteries.

In Comparative Example 9, the content ratio of the graphite A to the graphite B is 95%:5%, and in this case, the content of the secondary-particle graphite A is excessively high. While the gram capacity of the obtained composite artificial graphite is high, poor processability, low adhesion, and being easy to demold of the composite artificial graphite may be caused, resulting in the test of the expansion rate during cycling of the negative electrode plate to fail.

In Comparative Example 10, the content ratio of the graphite A to the graphite B is 30%:70%, and in this case, the content of the primary-particle graphite B is excessively high, which may result in a decrease in gram capacity of the composite artificial graphite, and also a relatively large expansion rate during cycling of the negative electrode plate, thereby degrading the energy density of the secondary battery.

In Comparative Examples 11-12, the same raw material and graphitization conditions are used for the graphite A and the graphite B. While the gram capacities of the obtained composite artificial graphites meet requirements, the expansion rates during cycling of the negative electrode plates are relatively large.

In Comparative Examples 13-14, the raw materials for preparing the graphite A are a metallurgical coke and a green pitch coke, and the secondary-particle graphites made of the raw materials have relatively low gram capacities. While using the obtained composite artificial graphites to prepare the negative electrode plates can reduce the expansion rates during cycling of the electrode plates, the composite artificial graphites have low gram capacities and low powder compacted densities, which significantly reduce the energy densities of the secondary batteries.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The invention claimed is:

1. A preparation method of a composite artificial graphite, comprising:
   preparing a first graphite, comprising:
      crushing, grading, and shaping a first raw material to obtain a first precursor;
      granulating the first precursor to obtain a first intermediate; and
      graphitizing the first intermediate at a temperature of 2800° C. to 3200° C. to obtain the first graphite;
      wherein the first graphite includes secondary particles and has a graphite interlayer spacing of 0.33560 nm to 0.33610 nm;
   preparing a second graphite, comprising:
      crushing, grading, and shaping a second raw material to obtain a second precursor;
      graphitizing the second precursor at a temperature of 2500° C. to 2700° C. to obtain the second graphite;
      wherein the second graphite includes primary particles and has a graphite interlayer spacing of 0.33620 nm to 0.33670 nm; and
   uniformly mixing the first graphite and the second graphite at a mass percentage of the first graphite of 40% to 90% and a mass percentage of the second graphite of 10% to 60%, to obtain the composite artificial graphite, wherein the mass percentage of the first graphite and the mass percentage of the second graphite are based on a weight of the composite artificial graphite.

2. The preparation method according to claim 1, wherein a binder is added during granulating the first precursor, and an amount of the binder is 4% to 16% of a weight of the first precursor.

3. The preparation method according to claim 1, wherein:
   the first raw material comprises one or more of a needle green petroleum coke, a non-needle green petroleum coke, a needle green coke of coal measures, a non-needle green coke of coal measures, a calcined needle coke, and a calcined petroleum coke; and
   the second raw material comprises one or more of a needle green petroleum coke, a non-needle green petroleum coke, a needle green coke of coal measures, a non-needle green coke of coal measures, a calcined needle coke, and a calcined petroleum coke.

4. The preparation method according to claim 1, wherein the first intermediate is graphitized at a temperature of 3000° C. to 3200° C., and the second precursor is graphitized at a temperature of 2500° C. to 2600° C.

5. The composite artificial graphite prepared by the preparation method of claim 1, comprising the first graphite and the second graphite.

6. The composite artificial graphite according to claim 5, wherein a volume mean particle size $D_v50$ of the composite artificial graphite is 11.5 μm to 21.5 μm.

7. The composite artificial graphite according to claim 5, wherein a number particle size distribution $D_n10$ of the composite artificial graphite is 1.3 μm to 6.5 μm.

8. The composite artificial graphite according to claim 5, wherein a powder compacted density of the composite artificial graphite under a pressure of 2000 kg is 1.55 g/cm$^3$ to 1.85 g/cm$^3$.

9. The composite artificial graphite according to claim 5, wherein a gram capacity of the composite artificial graphite is 335 mAh/g or more.

10. The composite artificial graphite according to claim 5, wherein:
    a volume mean particle size $D_v50$ of the first graphite is 11.5 μm to 21.5 μm;
    a number particle size distribution $D_n10$ of the first graphite is 1.5 μm to 7.5 μm;
    a volume mean particle size $D_v50$ of the second graphite is 8.0 μm to 20.0 μm; and/or
    a number particle size distribution $D_n10$ of the second graphite is 1.2 μm to 6.0 μm.

11. The composite artificial graphite according to claim 5, wherein:
    a degree of graphitization of the first graphite is 91% to 97%; and or
    a degree of graphitization of the second graphite is 85% to 90%.

12. A secondary battery, comprising a negative electrode plate comprising a negative electrode active material, the negative electrode active material comprising the composite artificial graphite prepared by the preparation method of claim 1, comprising the first graphite and the second graphite.

13. A battery module, comprising the secondary battery according to claim 12.

14. A battery pack, comprising the battery module according to claim 13.

15. A power consuming device, comprising the secondary battery according to claim 12.

* * * * *